United States Patent [19]

Grimm et al.

[11] Patent Number: 4,560,973

[45] Date of Patent: Dec. 24, 1985

[54] ROD SHAPED THERMOMETER AND METHOD OF MAKING SAME

[75] Inventors: Hermann Grimm, Ostelsheim; Wolfgang Volz, Magstadt; Ottmar Supper, Rottenburg; Martin Pfeiffer, Stuttgart-Moehringen, all of Fed. Rep. of Germany

[73] Assignee: Daimler-Benz Aktiengesellschaft, Fed. Rep. of Germany

[21] Appl. No.: 551,896

[22] Filed: Nov. 15, 1983

[51] Int. Cl.$^4$ .......................... G01K 1/16; G01K 7/18
[52] U.S. Cl. .................................. 338/28; 374/165; 374/185
[58] Field of Search ............... 374/183, 185, 163, 165, 374/208; 338/13, 25, 28

[56] References Cited

U.S. PATENT DOCUMENTS

| | | | |
|---|---|---|---|
| 2,012,112 | 8/1935 | States | 136/230 X |
| 2,195,019 | 3/1940 | Bloomheart | 374/183 X |
| 2,321,846 | 6/1943 | Obermaier | 374/185 X |
| 2,363,075 | 11/1944 | Mattern | 374/144 X |
| 2,749,753 | 6/1956 | Adams | 374/185 X |
| 2,961,625 | 11/1960 | Sion | 374/165 X |
| 3,165,426 | 1/1965 | Beckman | 374/179 X |
| 3,232,794 | 2/1966 | Korton | 136/230 X |
| 3,482,199 | 12/1969 | Curtis | 374/185 X |
| 3,508,185 | 4/1970 | Tulchinsky | 374/185 X |
| 3,592,059 | 7/1971 | Chilton | 374/165 |
| 3,822,598 | 7/1974 | Brothers et al. | 374/185 |
| 3,833,145 | 9/1974 | Crosby et al. | 29/199 X |
| 3,890,588 | 6/1975 | Kanaya et al. | 374/185 |
| 3,966,500 | 6/1976 | Brixy | 374/163 X |
| 4,085,398 | 4/1978 | Bertram et al. | 338/28 X |
| 4,114,444 | 9/1978 | Schwenninger et al. | 374/153 X |
| 4,246,787 | 1/1981 | Harper | 29/612 X |
| 4,276,775 | 7/1981 | Provasnik | 174/DIG. 8 X |
| 4,321,827 | 3/1982 | Anderson | 374/185 X |
| 4,416,553 | 11/1983 | Huebscher | 374/165 |
| 4,453,835 | 6/1984 | Clawson et al. | 374/185 |

Primary Examiner—Daniel M. Yasich
Attorney, Agent, or Firm—Barnes & Thornburg

[57] ABSTRACT

A thermometer is provided which is insertable between two lamella of a heat exchanger. The thermometer exhibits a double channeled insulated pipe or tube for receiving the uninsulated leads which are connected to a temperature sensitive resistance at a supporting connection with a cap surrounding a heat conducting mass. The other end of the double channeled tube is inserted into a connector device which in turn leads to a relieved connecting cable.

7 Claims, 2 Drawing Figures

ROD SHAPED THERMOMETER AND METHOD OF MAKING SAME

BACKGROUND AND SUMMARY OF THE INVENTION

The invention relates to a rod shaped thermometer which is insertable between two lamella of a heat exchanger. The thermometer includes a temperature sensitive resistance and attached connectors, the free uninsulated ends of the connectors are separated and insulated from one another by means of a web forming channels for the connectors.

There is a known thermometer of this kind wherein the ends of the connectors are inserted in the channels and the channels are then filled with elastic insulation material. With this arrangement it is difficult to prevent that there is no floating movement of the parts being covered. Furthermore, there is a certain time which elapses after the application of the insulation material until it is solidified, whereby only after a certain timespan can the insulation material projecting over the channel walls be removed by a suitable manufacturing procedure.

U.S. Pat. No. 2,938,385 and German Gebrauchsmuster (Gbm) No. 78 12 561 show prior art thermometers of the type the present invention is concerned with improving the structure and manufacturing process for.

A problem considered by the invention is the simplification and shortening of the manufacturing process of a thermometer of the indicated type, whereby simultaneously it will also be assured that a shifting or migration of the parts to be covered towards the outside does not occur.

For solving this problem, there is proposed a thermometer of the above-indicated kind whereby inventably the channels or grooves are connected by means of a surrounding wall which is so formed in an extrusion manufacturing process to result in a double channeled tube, and wherein the temperature sensitive resistance side is fixedly and permanently connected by a cap shoved on the end of the tube, which cap accommodates a heat conductive filling.

During the attaching procedure of the cap, the nondisplaceable portion of the filling material can overflow in the case the cap is provided with a centrally arranged bore.

Further objects, features, and advantages of the present invention will become more apparent from the following description when taken in connection with the accompanying drawings which show, for purposes of illustration only, an embodiment in accordance with the present invention.

DETAILED DESCRIPTION OF THE DRAWINGS

Figure 1:
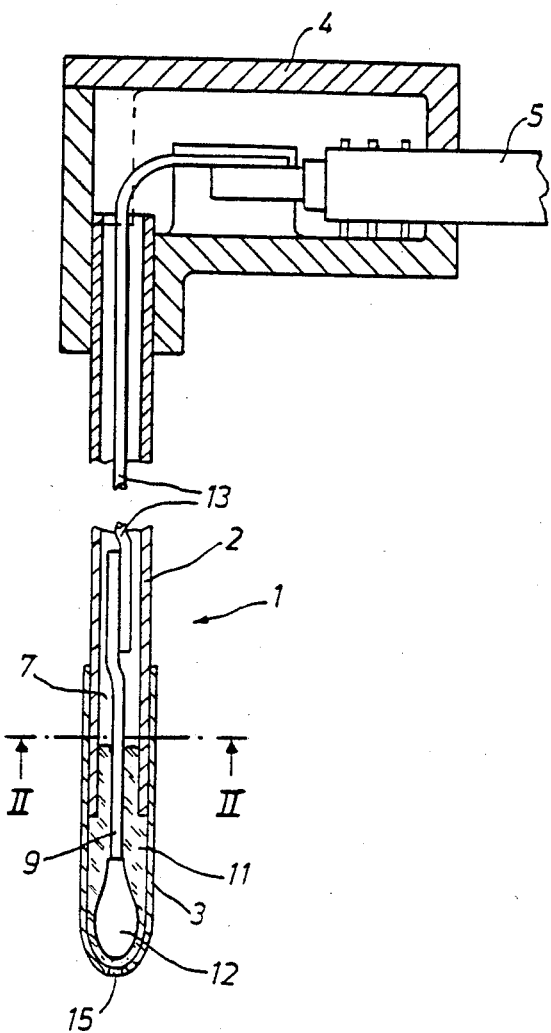
FIG. 1 is longitudinal sectional view through a thermometer constructed according to the invention.

A thermometer 1, which is insertable between two lamella of a heat exchanger (in a not further illustrated manner) to detect temperature, consists essentially of a double channeled tube 2 which is closed at one end by means of cap 3. Tube 2 is received at the other end by a connecting part 4, from which connecting part 4 the strain relieved connecting cable 5 extends.

Figure 2:
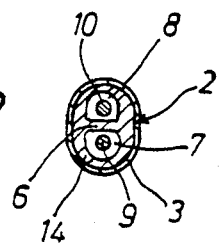
FIG. 2 is a sectional view along line II—II of FIG. 1.

The tube 2 exhibits—as can be seen from FIG. 2—a web 6 connecting the two channels 7 and 8. The channels accommodate the free connector ends 9 and 10 attached to a heat sensitive resistance 12 embedded in a heat conducting filling 11 and are connected with uninsulated line ends 13, which lead to the connecting cable 5 as shown in FIG. 1. In FIG. 1, it can be seen that connector end 9 contacts one uninsulated line end 13 within channel 7 of tube 2. In like manner (not visible from the perspective of FIG. 1), on the other side of web 6, connector end 10 contacts the other uninsulated line end 13 within channel 8 of tube 2.

The channels 7 and 8 are formed with the walls 14 and web 6 in such a manner so that the so formed double channeled tube 2 can be manufactured by an extrusion press process and the respective necessary length can be cut off. The tube 2 is preferably formed of synthetic resinous material which can readily be extruded and which serves as an electrical insulator. The lines 13 to be connected with the free conductor ends 9 and 10 are shoved into the channels 7 and 8 and the cap 3, after being partly filled with filling 11, is shoved onto the tube 2, whereby a permanent connection also to the tube is achieved and the nondisplaceable filling material can exhaust or escape through a centrally disposed bore 15.

The pipe or tube 2 with completely insulated conductor ends 9 and 10 as well as the lines 13 can be directly connected by inserting into the connecting part 4 and the lines 13 are then connected at the ends with the connecting cable 5.

While we have shown and described a single embodiment in accordance with the present invention, it is understood that the same is not limited thereto but is susceptible to numerous changes and modifications as would be known to those skilled in the art of the present disclosure and we therefore do not wish to be limited to the details shown and described therein but intend to cover all such changes and modifications as are encompassed by the scope of the appended claims.

What is claimed is:

1. A rod shaped thermometer for detecting the temperature in a heat exchanger comprising:
    a temperature sensing resistance with a pair of leads attached thereto, each said lead having a free end opposite the resistance,
    a tube having a tubular inside wall and web means integral with said inside tubular wall for forming two channels within said tube, said free ends of said leads extending into respective channels of said tube for connection with measuring device lines,
    cap means connected to the tube for accommodating the resistance, and
    means for providing an enhanced thermal conductivity path between the cap means and the resistance.

2. A thermometer according to claim 1, further comprising an electrical connector device attached to said tube at an end of said tube opposite said cap, said connector device including measuring device lines for conducting signals to and from said resistance, said measuring device lines having free ends extending into respective channels of said tube for contact with said leads.

3. The thermometer according to claim 1, wherein said means for providing an enhanced thermal conductivity path between the cap means and the resistance comprises a heat conductive filling.

4. A thermometer according to claim 3, wherein the cap is connected to the tube at least in part by the solidification of the heat conductive filling.

5. A thermometer according to claim 4, wherein the cap is provided with a centrally disposed bore to accommodate exhaust of excess heat conductive filling material during attachment of said cap to said tube.

6. A thermometer according to claim 5, further comprises an electrical connector device attached to said tube at an end of said tube opposite said cap, said connector device including measuring device lines for conducting signals to and from said resistance, said measuring device lines having free ends extending into respective channels of said tube for contact with said leads.

7. A thermometer according to claim 3, wherein the cap is provided with a centrally disposed bore to accommodate exhaust of excess heat conductive filling material during attachment of said cap to said tube.

* * * * *